No. 668,689. Patented Feb. 26, 1901.
M. H. REED.
ELECTRIC ATTACHMENT FOR RAILWAY SCALES.
(Application filed Mar. 30, 1900.)
(No Model.)
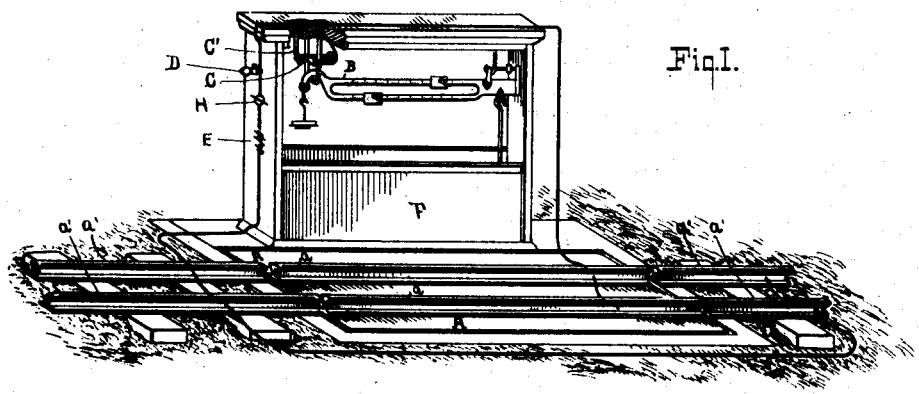
Fig. I.
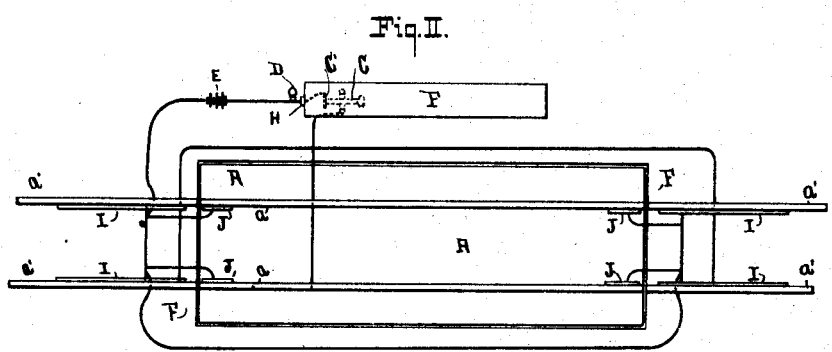
Fig. II.
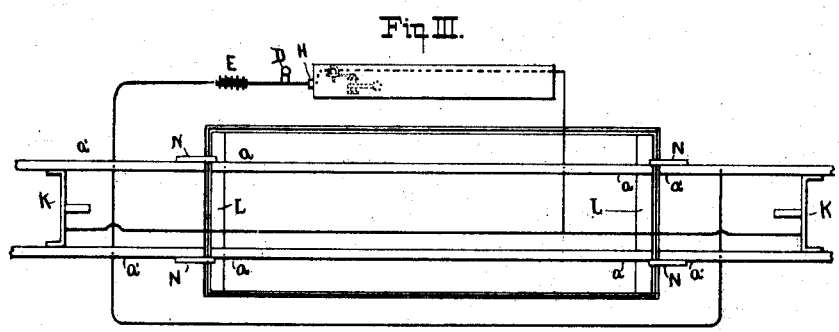
Fig. III.
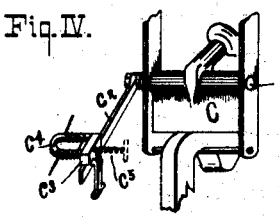
Fig. IV.
Witnesses.
Geo. H. Harvey
M. H. Caskey.
Inventor.
Matthew H. Reed,
by Wm. L. Pierce
his Attorney.
THE NORRIS PETERS CO., PHOTO-LITHO., WASHINGTON, D. C.

UNITED STATES PATENT OFFICE.

MATTHEW H. REED, OF PITTSBURG, PENNSYLVANIA.

ELECTRIC ATTACHMENT FOR RAILWAY-SCALES.

SPECIFICATION forming part of Letters Patent No. 668,689, dated February 26, 1901.

Application filed March 30, 1900. Serial No. 10,741. (No model.)

*To all whom it may concern:*

Be it known that I, MATTHEW H. REED, a citizen of the United States, residing at Pittsburg, in the county of Allegheny and State of Pennsylvania, have invented or discovered new and useful Improvements in Electric Attachments to Railway-Scales, of which the following is a specification.

In the accompanying drawings, which make part of this specification, Figure I is a perspective of one form of my invention. Fig. II is a plan of another form. Fig. III is a plan of another modification, and Fig. IV a detail perspective of certain parts of Fig. III.

The purpose of my invention, generally stated, is an electric signal used in connection with railway scales to indicate whether or not all conditions are secured for properly weighing the car.

In the use of railway-track scales errors may arise from the car not being entirely upon the platform, or the car to be weighed may rub against another car or be coupled thereto, or the rails on the scale-platform may, through some defect, be in rubbing contact with the track-rails at either end of the platform. My apparatus will also indicate, if desired, when the cars come on and pass off the scale-platform.

In Fig. I, A represents a scale-platform. *a a* are rails upon said platform. *a' a' a' a'* are the track-rails outside the platform. The beam B is placed in the usual way and is held in position by the trig-loop C. When this trig is thrown, it completes a circuit by coming in contact with the piece C', forming part of an electric circuit. When the trig-loop is holding the beam stationary, the switch is open. An electric bell or lamp or other means of showing that the circuit is complete is placed at D in circuit with the switch H and battery E. One of the wires from battery E is connected to the rails *a' a' a' a'* at each end of the scale F. The other wire is connected with the rails *a a* on the platform of the scale A.

The operation of the device is as follows: When the car G is run upon the scale-platform A to be weighed, the weighmaster throws the trig-loop C in the usual manner. This trig-loop makes an electric circuit complete by coming in contact with the piece C', provided the circuit is complete through the rails. However, if the car is properly on the scale, the circuit through the rails will not be complete, and the electric indicator, whether bell or lamp, will give no signal; but if the wheels at one end of the scale should touch the rails *a' a'* the electric circuit will be completed and the indicator will so show at D. When a car is pushed on the scale, the circuit will be broken and so show at the indicator D, and the weighmaster will know that the car is in position for weighing. Also if a car is moved too far across the scale-platform it will come in contact with the rails *a' a'* at the other end of the scale, completing the circuit, and the indicator will again notify the weighmaster the car is not in proper position to be weighed. The trig-loop C may be taken out of the circuit, and the switch H can be used, or both switches can be taken out of the circuit, so that the indicator will always show when the circuit is closed at the scale-platform. Preferably the trig-loop C is made a part of the circuit, as it is necessary that this trig-loop be thrown when weighing, which will always close the switch, while the circuit will always be open when the trig-loop is closed, thereby economizing the strength of the battery.

Advantage is taken of the metallic construction of car wheels, axles, couplings, &c.— viz., that the electric circuit will be closed through from one wheel or pair of wheels resting on the rails *a' a'* at the end of the scale F and one wheel or pair of wheels resting on the rails *a a* on the scale-platform A.

Fig. II represents another mode of connecting up my indicator, in which similar letters refer to similar parts, as shown on Fig. I, with the additions of parts I I, which are insulated metallic rails or plates placed convenient to rails at each end of the platform. Also similar insulated rails or plates J J are located on scale-platform at each end of scales. Both I I and J J are exposed to tread of the car-wheels. Rails or plates J J are long enough so that a car cannot have its wheel-base off this rail or plate and still be coupled to or touching a car on the scale. Plates I I are sufficiently short to give car-room between them on the scale. If a car rests on them at either end, an alarm will be given.

In Fig. II the operation is similar to that described. The plates or rails are electrically connected with one pole of the battery, and the rails $a\ a$ on scale-platform A and rails $a'\ a'\ a'\ a'$ at the ends of scale-platform F are electrically connected with the other pole of the battery, the switch H being preferably operated by trig-loop C and indicator D also being in the circuit. The operation is similar to Fig. I, as a passing car completes the circuit by making metallic or electrical connection between plates or rails I I I I and J J J J and rails $a'\ a'\ a'\ a'$ and $a\ a$, advantage being taken of the metallic construction of wheels only or of wheels, axles, and construction-work of car to make or complete the electric circuit. In the construction shown in Fig. I unless the couplings actually meet no alarm will be given, while in the construction shown at Fig. II alarm is given if cars come within a certain degree of proximity, even if not actually touching.

In the devices seen in Fig. III, I have provided springs N N, so arranged that when the car is close to the end of the platform of the scale the springs will be brought into contact with the rails $a\ a$ or other metal on the scale-platform A, said springs N N being electrically connected or attached to the rails $a'\ a'$. These mechanical means can be varied and can be used either in connection with the other means described in this specification or separately. Metal plates L L may be placed upon the ends of the platform and if the platform is of metal may be insulated therefrom, thereby insulating also the rails $a\ a$, which are supported on said plates from the platform. The edge of the frame may be bound with a metal rim M, so that if the metal platform or metal plates L L rub a signal will be given. In operation the springs N N N N are pressed by the wheels or the weight of the car, so that they will close the electric circuit in which they are placed. These springs are preferably brought in contact with some portion of metallic rails or plates or metal placed on scale-platform, but can be made in the form of electric switches operated off or on the scale-platform. When the car passes, the springs will rise and break the electric circuit. These springs should be long enough to prevent cars coming too near the platform. Mechanical levers K K may also be used to be raised by the passing of cars and make electric connections with a circuit completed through the car-bumpers which the springs touch.

In Fig. IV, I have shown a detail of a locking device by which the trig-loop C is prevented from being thrown up as long as the electric circuit is complete. Upon the shaft $c'$ of the trig-loop is fixed a locking-arm $c^2$, dogged by the armature $c^3$ of the magnet $c^4$, which locking-arm is released by the spring $c^5$ pulling said pivoted armature away when the circuit is broken.

Having described my invention, I claim—

1. In combination with a track-scale, an electric circuit connected with the rails on the scale and to the rails on the track outside the scale and an indicator in said circuit to show when the car is not in proper position to be weighed.

2. The combination of a railway-track scale; a track on said scale; a track leading to said scale; an electric circuit connecting said tracks, and a car completing said circuit.

3. The combination of a railway-track scale; a track leading to said scale; an electric circuit connected with said track and with said scale-platform and a connection in said circuit completed by the throwing of the trig-loop.

4. The combination of a railway-track scale; a track leading to said scale; an electric circuit connected with said track and with said scale-platform, a trig-loop and means for locking the same when the circuit is complete.

5. The combination of a railway-track scale; a track leading to said scale; an electric circuit having contact-plates on said scale and said track, and means for breaking the circuit by the movement of the car on the scale contact-plates.

Signed at Pittsburg, Pennsylvania, this 24th day of March, 1900.

MATTHEW H. REED.

Witnesses:
 WM. L. PIERCE,
 L. D. IAMS.